United States Patent [19]

Lownertz

[11] Patent Number: 5,507,912
[45] Date of Patent: Apr. 16, 1996

[54] KRAFT PULPING PROCESS WHEREIN SULPHIDE-RICH AND SULPHIDE-LEAN WHITE LIQUORS ARE GENERATED

[75] Inventor: Patrik P. H. Lownertz, Vancouver, Canada

[73] Assignee: H. A. Simons Ltd., Vancouver, Canada

[21] Appl. No.: 168,652

[22] Filed: Dec. 15, 1993

Related U.S. Application Data

[63] Continuation-in-part of Ser. No. 699,687, May 13, 1991, abandoned.

[51] Int. Cl.$^6$ .................................................. D21C 11/04
[52] U.S. Cl. .......................... 162/30.11; 162/31; 162/35
[58] Field of Search .................. 162/29, 30.1, 30.11, 162/31, 82, 35

[56] References Cited

U.S. PATENT DOCUMENTS

| | | | |
|---|---|---|---|
| 3,909,344 | 9/1975 | Lukes | 162/30.11 |
| 4,299,652 | 11/1981 | Masuno et al. | 162/30.1 |
| 4,302,281 | 11/1981 | Ryham | 162/30.11 |
| 4,692,209 | 9/1987 | Santen | 162/30.11 |

FOREIGN PATENT DOCUMENTS

| | | |
|---|---|---|
| 923256 | 3/1973 | Canada . |
| 1221809 | 12/1987 | Canada . |

OTHER PUBLICATIONS

Lundborg, S., "Ekonomisk amalys av kausticering vid lag styrka kombinerat med vitlutindustning (Economical analysis of causticizing at low strength combined with white liquor evaporation)", in Swedish, Proceedings of the Swedish Paper and Cellulose Engineers Association (SPCI) 2nd Causticizing Symposium, pp. 22–32, 1982.

Blackwell, B. R., et al., "Kraft dead load reduction by white liquor evaporation: Theoretical analysis of a proposed process", Pulp and Paper Canada 87:10 pp. T378–384, 1986.

Larsson, A., et al., "High concentration causticizing–possibilities and limitations", Preprints of the CPPA International Chemical Recovery Conference, Ottawa, pp. 145–149, 1989.

Johansson, B. and Teder, A., "Modified kraft processes–a way to reduced environmental influence and reduced energy consumption", Proceedings of the 2nd World Congress of Chemical Engineering, Montreal, pp. 235–242, 1981.

Hartler, N. and Olsson, L. A., "Hydrogen sulphide cooking––Part 1, first stage variables", Svensk Papperstidning 75:13, pp. 559–565, 1972.

Cox, L. A. and Worster, H. E., "A status report on MacMillan Bloedel's hydrogen sulphide–kraft pulping process", Pulp & Paper Magazine of Canada 73:9, pp. 106–109, 1972.

Andrews, E. K., Chang, H–m, Kirkman, A. G. and Eckert, R. C., "Extended delignification in kraft/oxygen pulping of softwood by treatment with sodium sulphide liquors", Japan TAPPI International Symposium on Wood Pulp Chemistry, pp. 177–182, 1982.

Kirkman, A. G., Andrews, E. K., Chang, H–m, "Impact on extended delignification using green liquor pre–treatments on kraft mill chemical and energy balances", AIChE Symposium Series 86, pp. 66–73, 1984.

*Primary Examiner*—Steven Alvo
*Attorney, Agent, or Firm*—Vilhauer, McClung & Stenzel Chernoff

[57] ABSTRACT

There is disclosed a process of increasing efficiency in a kraft pulping process that utilizes initial, bulk, and final delignification steps, a recovery boiler, and a caustic treatment step, which allows production of a white liquor stream that is separated into a sulphide-lean and sulphide-rich streams.

9 Claims, 2 Drawing Sheets

5,507,912

KRAFT PULPING PROCESS WHEREIN SULPHIDE-RICH AND SULPHIDE-LEAN WHITE LIQUORS ARE GENERATED

This application is a continuation-in-part of application Ser. No. 07/699,687, filed May 13, 1991, now abandoned

FIELD OF THE INVENTION

This invention pertains to a novel process for producing white liquor in separate streams to obtain higher efficiencies in a kraft pulp digesting reactor. More particularly, this invention relates to producing white liquor in a sulphide-lean stream and a sulphide-rich stream which enables improved efficiencies to be obtained in a kraft pulp digesting process such as the Kamyr modified continuous cooking process.

BACKGROUND OF THE INVENTION

In conventional pulping operations, the raw cellulosic fibrous material, generally wood chips, is digested in a pulping liquor, generally known as a "white liquor". This latter term is used in this specification generally to refer to liquors containing dissolved sodium hydroxide. After the digestion step, the pulp is separated from spent pulping liquor, known as "black liquor".

In the normal kraft process, the cellulosic fibrous material, generally wood chips, is digested by heating with a white liquor containing sodium sulphide and sodium hydroxide to dissolve from the wood chips a substantial part of the hemicelluloses and lignin therein. The fibrous material so produced is separated from the resulting black liquor, by washing counter-current with water in a brown stock washing plant and, thereafter, may be passed to a bleaching process.

The black liquor is subjected to a series of operations in a recovery system. The black liquor first is concentrated by evaporation of water and the concentrated black liquor is burned in a furnace to yield a smelt containing mainly sodium carbonate and sodium sulphide. The smelt is dissolved in water to yield a raw green liquor which then is clarified. The dregs resulting from the clarification, generally consisting of insoluble salts of metal cations other than sodium and potassium, and of clear residues, are washed with water and discarded.

The clarified green liquor is causticized with slaked lime whereby the sodium carbonate is converted to sodium hydroxide and calcium carbonate is precipitated as a mud. The mud is washed with water and calcined to regenerate lime for further causticization. The causticized green liquor is then recycled as white liquor to the digester. The wash water from the dregs and the mud, generally referred to as "weak wash" or "weak white liquor", is usually used as water for dissolving the smelt.

Sulphur and sodium containing by-products from chlorine dioxide generation, purchased sodium sulphate, and elemental sulphur and/or sodium hydroxide or soda ash, are added to the recovery operation to provide make-up sodium and sulphur values to the system. Generally the sodium sulphate is added to the black liquor before it is fed to the furnace. The sodium and sulphur values in the furnace give sodium sulphide and sodium carbonate, the sodium carbonate being converted to sodium hydroxide on later causticization. In this manner, the sodium hydroxide and sodium sulphide content of the white liquor is maintained at the desired level.

During the past decade, and because of environmental concerns, considerable effort has been invested in improving the efficiencies of traditional pulp and paper manufacturing facilities in North America, and elsewhere, and minimizing the discharge of pollutants from such mills. In recent years, kraft pulp digesting processes employing what is commonly known as a modified continuous cooking (MCC) process have become popular. A digester system known as the Kamyr modified continuous cooking process digester system has been widely installed in pulp and paper manufacturing facilities throughout the world.

In a conventional pulping process, the lignin in the pulp must be separated from the cellulose and hemicellulose. However, in the process, the delignification reaction must be emphasized while the cellulose and hemicellulose degradation reactions must be minimized. Degraded cellulose and hemicellulose reduce the inherent strength qualities of the pulp for paper making. It is therefore important in a pulping process to obtain high selectivity. The term "high selectivity" in a pulping process means that the rate of the delignification reaction is high compared to the rates of reactions that degrade cellulose and hemicellulose. High selectivity in pulping makes it possible to produce a pulp with low residual lignin content prior to bleaching while maintaining good pulp strength by minimizing cellulose and hemicellulose degradation. By minimizing the lignin content of the pulp entering the bleach plant, less lignin has to be removed through the bleaching process, thus reducing bleach chemicals consumption and the contaminant content of the bleach plant effluent.

In the Kamyr MCC pulping process, the selectivity of the process compared to a conventional process has been improved by keeping the hydroxide concentration moderate and even throughout the cook, and keeping the dissolved lignin and sodium concentration as low as possible, which is especially important during the final phase of the cook.

In the Kaymr MCC process, the alkali charge is generally divided into three portions, one to the impregnation vessel, one to the trim circulation and one to the final part of the cook. In this manner, the hydroxide concentration is evened out throughout the process. Further, the final phase of the cook is carried out in countercurrent mode to lower the dissolved lignin concentration during this phase. In certain recent Kamyr MCC installations, a four-way split of the white liquor charge is made, with the three portions applied as discussed, and the fourth portion applied to the wash zone recirculation. However, the triple- or quadruple-divided alkali charge also has an undesired consequence—it lowers the sulphide concentration during the early stages of the cook where the sulfide is beneficial to the selectivity of the cook. This is because part of the white liquor is charged to the latter portion of the cook where sulphide content does not have any beneficial effect.

It is known that the selectivity of the modified Kamyr MCC process or other kraft delignification processes can be improved by increasing the sulphide concentration in the early stages of the cook.

Canadian Patent No. 923,256, Rapson et al disclose a process of recovery of spent chemicals from the pulping of cellulosic fibrous material, including the step of treating a smelt containing sodium sulphide, which comprises contacting the smelt with a solution of sodium hydroxide having a concentration of about 15 to 40% NaOH to dissolve sodium sulphide from the smelt. They obtain this high concentration sodium hydroxide solution by evaporating a sulfide-lean white liquor. The process is primarily directed to removing sodium chloride from the smelt. Sodium sulphide is preferentially dissolved in the sodium hydroxide solution, thereby separating sodium chloride. The process produces a single stream of white liquor for use in the pulping process. There is no mention of separate sulfide-lean and sulfide-rich white liquor streams which are directed to different phases, initial, bulk, and final, of the delignification procedure to thereby provide improved efficiencies in a pulping process.

Lukes et al., U.S. Pat. No. 3,909,344, describes a process primarily aimed at the removal of sodium chloride from the kraft pulping recovery cycle. To achieve this, an aqueous solution of smelt containing sodium carbonate, sodium sulfide and sodium chloride, obtained by dissolving the smelt in a solution of sodium carbonate and sodium chloride (neither of these solutions being a white liquor) is cooled to effect crystallization of the solid heptahydrate or decahydrate of sodium carbonate from the solution at temperatures around 25° C. This hydrate is then separated from the mother liquor, dissolved and causticized. The mother liquor is then treated in a number of steps including evaporation and carbonation to separate the chloride and sulfide values from the liquor.

SUMMARY OF THE INVENTION

The invention is directed to a kraft digesting process which utilizes sodium hydroxide containing white liquor in a novel way. The white liquor is separated into a sulphide-lean white liquor stream and a sulphide-rich white liquor stream. The sulphide-rich stream is directed to the initial phase or the first two phases of the digestion process, where high sulfide content is beneficial, to thereby improve process efficiency. The sulfide-lean white liquor stream can be directed to a final phase of the digesting process where low sulfide content is beneficial.

The invention pertains to a process of increasing efficiency levels in a kraft pulping process involving initial bulk and final phases of delignification of lignocellulosic materials, a recovery boiler, and a causticising plant comprising: (a) leaching solid sodium sulfide and sodium carbonate containing smelt from the recovery boiler with a sulphide-lean white liquor from the causticising plant to obtain a sulphide-rich white liquor comprising sodium sulphide and sodium hydroxide in an aqueous solution with a sulphur-to-sodium content ratio substantially higher than than of the smelt and solid particles containing sodium carbonate; (b) separating the sodium carbonate containing solid particles from the sulphide-rich white liquor; (c) dissolving the sodium carbonate content of the solid particles in water or a weak wash from the causticizing plant to form a sodium carbonate solution; (d) causticizing the sodium carbonate solution in the causticizing plant to produce the sulfide-lean white liquor of step (a), said sulfide-lean liquor having a sodium hydroxide content less than 15% by weight; and (e) directing at least part of the sulphide-rich white liquor to the initial phase of the delignification process.

In the process, excess sulphide-rich white liquor from the initial phase can be directed to the beginning of the bulk delignification phase of the delignification process. A portion of the sulfide-lean white liquor can be directed to the final phase of the delignification process.

The smelt-leaching process can be operated at boiling temperatures under a steam blanket and sealed from atmosphere.

A portion of the sulfide-rich white liquor, the solid sodium carbonate, the sodium carbonate solution and the sulfide-lean white liquor can be used in other pulping processes, pulp oxygen delignification plants, pulp bleaching plants or flue gas scrubbing processes.

The sodium carbonate can be purified to produce a material with a low sulfide content. The sodium carbonate can be purified by washing.

The invention is also directed to a process of generating a sulfide-rich white liquor and a sulfide-lean white liquor for use in a kraft pulping process which includes initial, bulk and final cellulosic material delignification phases, a recovery boiler, and a causticising plant, which process comprises: (a) introducing smelt from the recovery boiler into a vessel, said smelt containing molten sodium sulphide and sodium carbonate; (b) treating the smelt with a liquid whereby the smelt is dispersed and solidified into particles; (c) separating the particles into small and large particles and passing the small particles into a slurry tank where sodium sulphide is preferentially dissolved from the particles; (d) passing the large particles into a lump dissolving tank and dissolving the large particles therein; (e) adding a sulphide-lean white liquor to the lump dissolving tank, then transferring the resulting solution to the slurry tank; (f) separating the contents of the tank into a sulfide-rich white liquor having a substantially lower sulphur-to-sodium content ratio than the sulphur-to-sodium content ratio of the smelt, and a solid containing sodium carbonate; (g) dissolving the sodium carbonate containing solid in a weak wash obtained from the causticizing plant and then in the causticizing plant converting the resulting solution to a sulfide-lean white liquor having a substantially lower sulphur-to-sodium content ratio than the sulphur-to-sodium content ratio of the smelt; and (h) directing the sulfide-rich white liquor to an initial phase of the delignification process.

The solid sodium carbonate can be washed to reduce its sulphide content. This can be achieved by passing the solid sodium carbonate from step (f) into a dilution tank for reslurrying and then through a secondary separator before proceeding to step (g). Liquor from the lump dissolving tank can be used to prepare the slurry in the dilution tank and the solution separated from the solid sodium carbonate in the secondary separation stage can be returned to the slurry tank of stage (c).

Excess sulfide-rich white liquor from the initial phase can be directed to the beginning of a bulk delignification phase in the process. A portion of the sulfide-lean white liquor can be directed to the final phase of the delignification process.

DRAWINGS

In drawings which illustrate specific embodiments of the invention, but which should not be construed as restricting the scope of the invention in any way:

FIG. 1 illustrates a schematic block diagram of a recovery boiler, causticizing plant and digester plant incorporating a smelt leaching process without slurry washing; and FIG. 2 illustrates a block diagram of a recovery boiler, causticizing plant and digester plant incorporating a smelt leaching process with slurry washing.

DETAILED DESCRIPTION OF SPECIFIC EMBODIMENTS OF THE INVENTION

Figure 1:
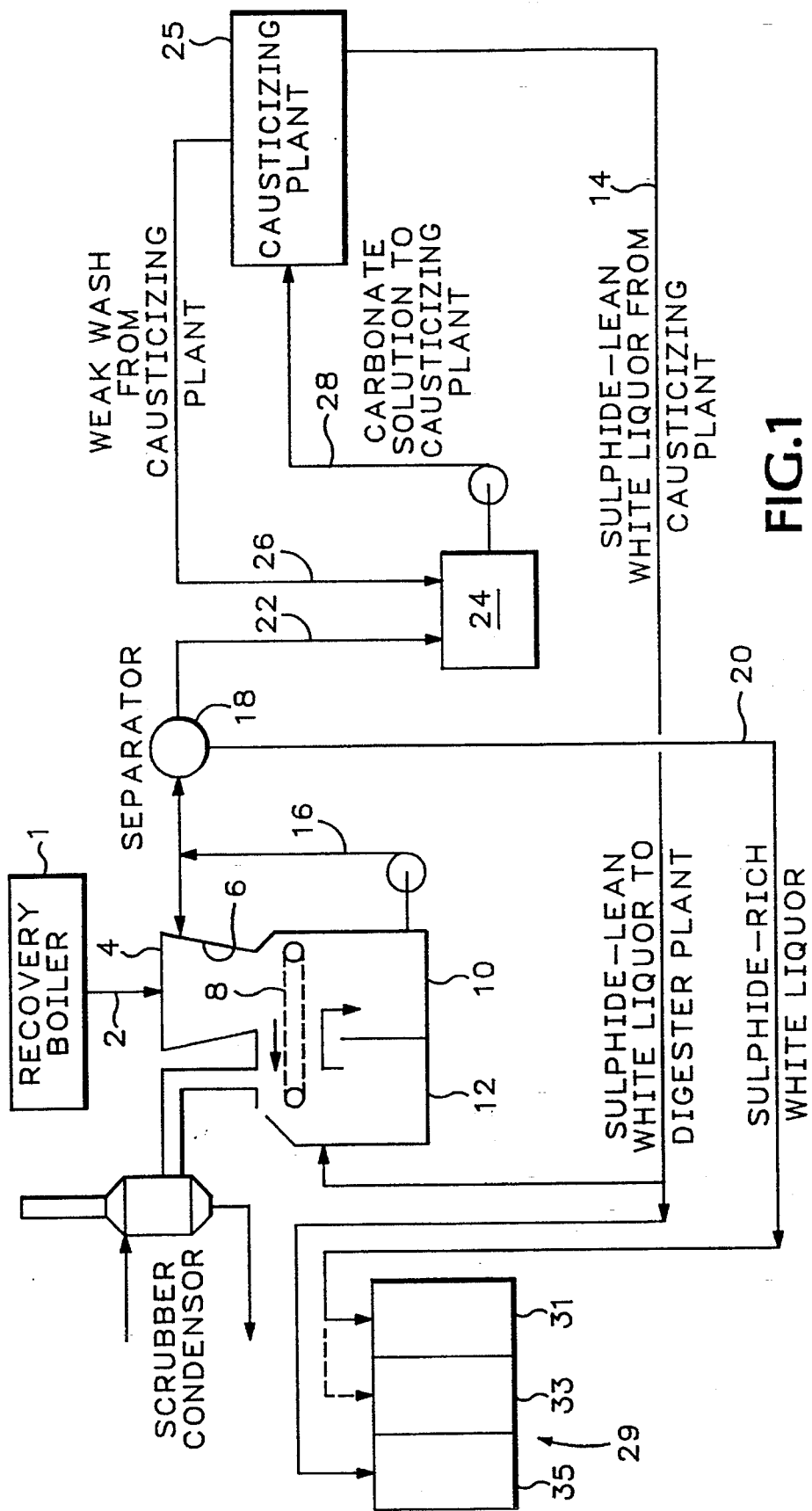

Referring to FIG. 1, which illustrates a block diagram of a smelt leaching process without slurry washing, the smelt 2 from the recovery boiler 1 mainly consisting of molten sodium sulphide ($Na_2S$) and sodium carbonate ($Na_2CO_3$)

enters a smelt hopper 4, where it comes in contact with a slurry that continuously flushes the hopper walls 6. Through this contact, the smelt 2 is dispersed and solidified into small particles. These small particles pass through a smelt screen 8 into the slurry tank 10 where sodium sulphide is preferentially dissolved from the particles. Any large particles not passing through the smelt screen 8 are discharged into a weak liquor tank 12 where they are dissolved.

This part of the system utilizes the technology developed by Ebara (Mizuguichi, S. and Naito, T., "NSSC recovery process uses direct oxidation", Pulp & Paper Canada, 79:8, p. T251–253, 1978;and Teder, A., "Japansk metod foradlar sodahussmalta" ("Japanese method processes recovery boiler smelt"), In Swedish, Nordisk Cellulosa Nr. 2, p. 12–14, 1984) for the NSSC recovery, the subject matter of which is incorporated herein by reference. The process of the subject invention, however, among other significant modifications which are discussed later, modifies the Ebara technology to avoid oxidation of sulphide and utilizes the heat content of the smelt to evaporate water from the liquor. These modifications include operating the system under boiling conditions under a steam blanket instead of cooling with coils in the slurry tank and closing of the tanks to avoid air infiltration.

Sulphide-lean white liquor 14 from the causticizing plant 25 is continuously added to the weak liquor tank 12 and liquor overflows from this tank 12 to maintain the level in the slurry tank 10. In this disclosure, the term sulfide-lean white liquor means a white liquor which contains sodium hydroxide and which has a sulfide to sodium content ratio which is substantially lower than the corresponding sulfide to sodium content ratio in the recovery boiler smelt 2. This sulfide-lean white liquor 14 is not to be confused with the weak wash 26 obtained from the causticising plant.

Slurry 16 from the slurry tank 10, mainly consisting of solid sodium carbonate in a solution of sodium sulphide and sodium hydroxide, is separated in a separator 18 into an overflow sulphide-rich white liquor 20 of extremely high causticity (low carbonate content) with a high concentration of sodium hydroxide and sodium sulfide, and a cake 22 consisting mainly of sodium carbonate. In this disclosure, sulfide-rich white liquor means a white liquor which contains sodium hydroxide and which has a sulfide to sodium content ratio substantially higher than the corresponding sulfide to sodium content ratio in the recovery boiler smelt 2.

The solid sodium carbonate cake 22 is dissolved in a carbonate dissolving tank 24 in weak wash 26 obtained from the causticizing plant 25. The resulting carbonate solution 28 is then sent to the causticizing plant 25 and is causticized in a conventional manner to a sulphide-lean white liquor 14.

In kraft pulping processes in general, the delignification of the cellulosic material proceeds according to three phases, "initial", "bulk" and "final". The three phases are characterized by different delignification reaction rates and different influence of hydrosulfide ions on the delignification reaction rate. The transition points between the different phases can be gauged by the content of undissolved lignin of the cellulosic material. For typical softwoods, the transition between initial and bulk delignification will occur at an undissolved lignin content of the cellulosic material in the range of about 25% and 20% weight calculated on dry wood. The transition between bulk and final phase delignification will occur at an undissolved lignin content in the range of between about 4% and 1% weight cellulosic material calculated on dry wood. It is to be understood that for the purposes of this disclosure, and in terms of softwoods, the terms "initial", "bulk" and "final" refer to these ranges. The lignin content of the pulp at the transition point between bulk and final delignification is influenced by the pulping conditions during the initial and bulk delignification phases. It will be understood as well that the foregoing percentage ranges are approximate and will vary according to the type of wood used in the process. Nonetheless, the general concept remains the same. The concepts of and terms "initial", "bulk" and "final" delignification are well defined in a publication entitled "Delignification Studies-Factors Affecting the Amount of "Residual Lignin", Peter Axegard et al, Swedish Paper Journal 1983, p. R178–84,the contents of which are incorporated herein by reference.

The sulfide-rich white liquor 20 is directed to the initial phase of delignification 31 taking place in the digester plant 29 where high sulfide levels are beneficial. The sulfide-rich white liquor 20 can also optionally be directed to the early bulk phase delignification 33 taking place in the digester plant 29. A portion of the sulfide-lean white liquor 14 can be directed to the final phase 35 of the digester plant 29.

Optionally, if a sulphide-lean white liquor or carbonate solution with a very low sulphide content is required for other purposes (i.e. for use in flue gas scrubbing) a washing stage can be included. An example of such an arrangement is shown in FIG. 2, which represents a block diagram of a smelt leaching process with slurry washing.

Figure 2:
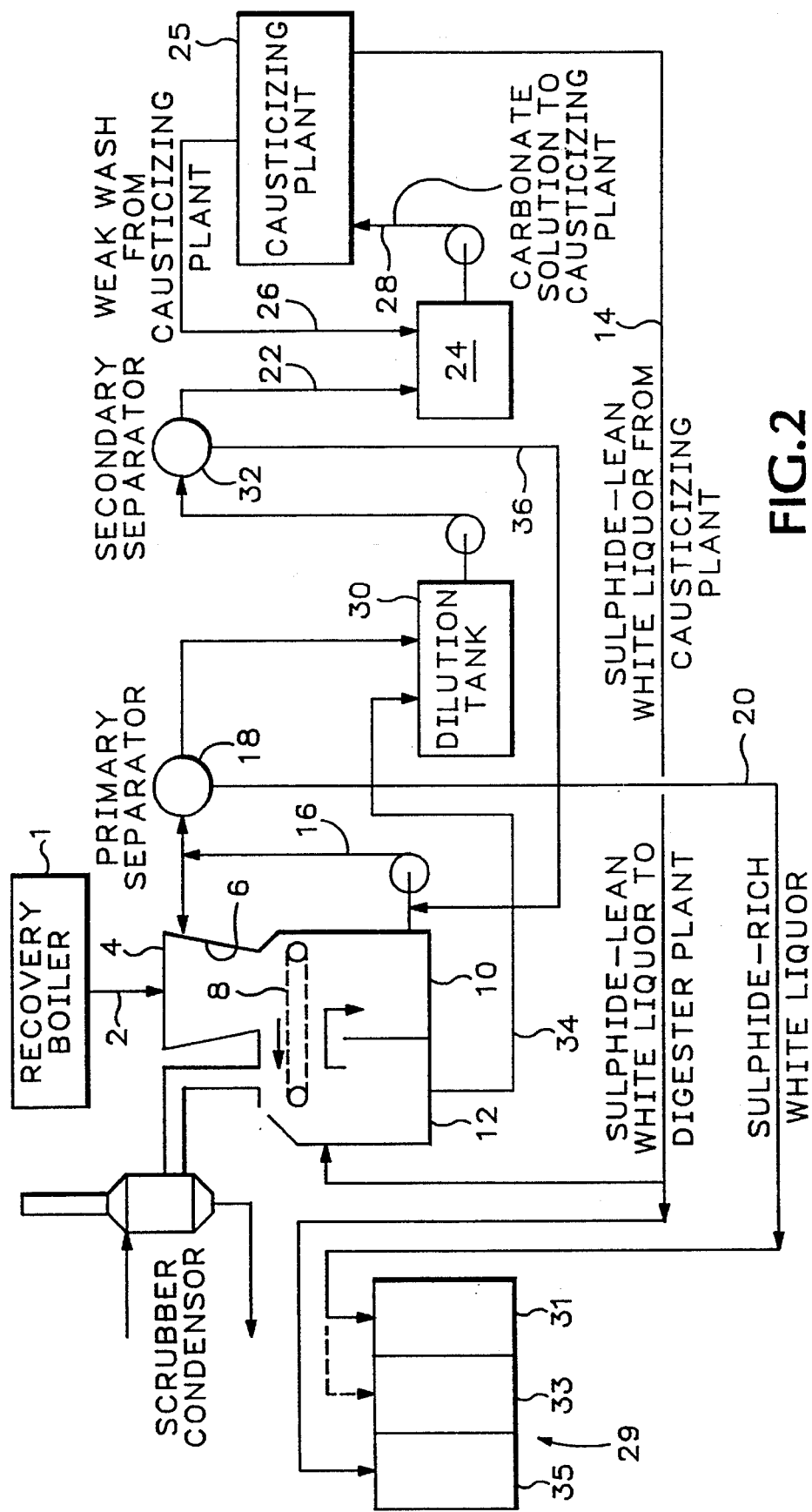

The process illustrated in FIG. 2 is similar to that shown in FIG. 1. However, a dilution tank 30 and a secondary separator 32 are included. Some liquor from lump dissolving tank 12 is transported through line 34 to the dilution tank 30 where it is used to re-slurry the solids from the primary separator 18. The washed sodium carbonate solids of the slurry in the dilution tank 30 are then separated from the wash liquor in the secondary separator 32. The solids are then discharged to the carbonate dissolving tank 24 and the liquor from the secondary separator 32 is led by line 36 to the slurry in line 16. A slurry from secondary separator 32 is cycled by line 36 to the slurry in line 16 from slurry tank 10.

Process Operating Conditions

To promote high selectivity in the kraft pulping process, the following main guidelines should be followed:

1. The hydroxide concentration should be kept moderate and consistent throughout the cook;
2. The dissolved lignin and sodium concentration should be kept as low as possible. This is especially important during the final phase of the cook.
3. The hydrosulphide concentration during the initial and bulk delignification phases of the cook should be as high as possible.

A typical MCC process focuses on the first two main rules. However, the process of the invention, which produces a sulfide-lean white liquor 14 and a sulfide-rich white liquor 20, enables the hydrosulphide concentration during the initial and bulk delignification phases of the cook to remain as high as possible, by directing sulphide-rich liquor with the major part of the sulphide content of the recovery boiler smelt only to the initial and bulk delignification phases of the cook while the sulphide-lean liquor would be used in the final phase of the cook and to cover other sodium hydroxide requirements in the mill such as for oxygen delignification.

At a 35% average white liquor sulphidity, the average overall liquor concentration increases by about 60%, giving lower steam consumption in the digester and evaporation plants and decreasing evaporator capacity requirement. The process of the invention decreases the hydraulic load on the causticizing plant 25 by 20% to 30%. The process of the invention also provides an opportunity to improve total white liquor causticity, that is, to lower the content of inactive sodium carbonate in the white liquor.

In contrast to a conventional white liquor evaporation process, the process of the invention does not require any steam since the process is driven by the concentration and temperature difference between the smelt 2 and the white liquor.

Most steps of the process can readily utilize established technology from the Ebara recovery process and from the soda ash industry. Further, the process makes available sulphide-lean carbonate and white liquor for use in applications such as flue gas scrubbing, neutral sulphite semi-chemical (NSSC) pulping, oxygen delignification plants and bleach plant extraction stages, and general pH control.

Also, part of the sulphide-rich white liquor stream 20 can find application in processes such as yield-improving hydrosulphide pretreatment, and sulphite liquor preparation systems.

White Liquor Preparation—Conventional Reference Case

Smelt 2 from a kraft process recovery boiler 1 is processed through a conventional white liquor preparation process to yield a product white liquor as tabulated in Table 1:

TABLE 1

|  | Smelt | White Liquor |
|---|---|---|
| Water (kg) | 0.0 | 1639.5 |
| Sodium Carbonate (kg) | 231.6 | 38.2 |
| Sodium sulphide (kg) | 76.6 | 76.6 |
| Sodium sulphate (kg) | 7.3 | 7.3 |
| Sodium hydroxide (kg) | 0.0 | 145.8 |
| Insoluble inerts (kg) | 3.6 | 0.04 |
| Effective alkali |  |  |
| (as kg NaOH) | — | 185.0 |
| (as kg Na$_2$O) | — | 143.4 |
| Sulphidity (% on active alkali) | — | 35.0 |

White Liquor Preparation

The same process recovery boiler smelt 2 as for the reference case is used in the smelt separation process of this invention but it is converted to a sulphide-rich white liquor 20 and a sulphide-lean white liquor 14 with compositions as shown in Table 2.

TABLE 2

|  |  | White Liquor | |
|---|---|---|---|
| Component | Smelt | Sulphide-Rich | Sulphide-Lean |
| Water (kg) | 0.0 | 316.5 | 712.5 |
| Sodium carbonate (kg) | 231.6 | ~0 | 26.3 |
| Sodium sulphide (kg) | 76.6 | 72.3 | 4.3 |
| Sodium sulphate (kg) | 7.3 | ~0 | 7.3 |
| Sodium hydroxide (kg) | 0.0 | 61.5 | 93.0 |
| Insoluble inerts (kg) | 3.6 | ~0 | 0.02 |

TABLE 2-continued

|  |  | White Liquor | |
|---|---|---|---|
| Component | Smelt | Sulphide-Rich | Sulphide-Lean |
| Effective alkali |  |  |  |
| (as NaOH kg) | N/A | 98.6 | 95.2 |
| (as Na$_2$O kg) | N/A | 76.4 | 73.8 |
| Sulphidity (% on active alkali) | N/A | 54.7 | 4.5 |

The medium used for smelt leaching is a part of the sulphide-lean white liquor 14, which is obtained from the causticising plant 25. The advantages of using undiluted sulfide-lean white liquor 14 of the concentrations disclosed in this specification (typically less than 15% socium hydroxide by weight) as the leaching liquor is that optimal energy benefits are provided, maximum active alkali levels in the sulfide-rich stream are maintained and causticity of both the sulfide-rich 20 and sulfide-lean 14 white liquor streams are maintained at high levels. The combined concentration of dissolved sodium sulphide and sodium hydroxide in the smelt leaching step is held at 30% of the weight of the solution. The sulphide-rich white liquor 20 is separated from the sodium carbonate, sodium sulphide and insoluble inerts of the slurry to yield a cake 22 with about 85% solids and 15% solution by weight and a clear sulphide-rich white liquor 20. The cake 22 is dissolved in weak wash 26 from the causticizing plant 25 to yield a solution 28 with the same total alkali content as that of the green liquor of the reference case. The causticizing reaction is assumed to proceed to a causticity equivalent to about 95% of the equilibrium causticity as was assumed for the reference case. As can be seen upon comparing Tables 1 and 2, the total yield of sodium hydroxide from the sodium carbonate content of the smelt is about 6% higher for the white liquor preparation process of the invention compared to the conventional process of the reference case.

Impact on Digesting Process

Table 3 shows water balances and sulphide amount and concentration for a modified continuous digesting process with divided alkali charges at a point that corresponds to the early bulk phase of delignification where a high sulphide level is beneficial, both in combination with the conventional reference case white liquor of Table 1 (Case A) and with the white liquors of the process of this invention (Case B).

TABLE 3

|  | Case A | Case B |
|---|---|---|
| Presteaming condensate (tonnes/tonnes bone dry wood) | 0.29 | 0.29 |
| Condensate from direct medium pressure steam (tonnes/tonnes bone dry wood) | 0.14 | 0.12 |
| White liquor | 1.33 | 0.70 |
| Sulphide-rich (tonnes/tonnes bone dry wood) | N/A | 0.32 |
| Sulphide-lean (tonnes/tonnes bone dry wood) | N/A | 0.38 |
| Wood Moisture (tonnes/tonnes bone dry wood) | 2.00 | 2.00 |
| Total water added | 2.76 | 2.11 |
| Sodium sulphide charged (kg/tonne of bone dry wood) to impregnation vessel or trim circulation | 62.1 | 74.5 |
| Sodium sulphide concentration (kg/tonne of water) | 22.5 | 35.3 |

With the process of this invention, the sulphide-rich white liquor 20 is charged to the impregnation vessel or its top circulation. Any remaining sulphide-rich white liquor is charged to the digester trim circulation.

The sulphide-lean white liquor 14 is preferentially charged to the countercurrent (final) phase of the cook. The excess effective alkali produced by the white liquor preparation process of this invention, compared to the conventional process of the reference case, is used as sulphide-lean white liquor elsewhere outside the digesting process. For example, the alkali content and quality of this excess stream matches well the requirements of an oxygen delignification plant as frequently used to further delignify the pulp following the digesting process.

The relative increase in sulphide concentration at the trim circulation as shown in Table 3 of 57% is equivalent to increasing the sulphidity of the white liquor of the conventional process from about 35% to about 50%.

Smelt Separation and Countercurrent Impregnation

The relative hydrosulphide concentration in the initial and bulk delignification stages 31 and 33 of the digesting process 29 can be further increased if smelt separation is combined with black liquor countercurrent impregnation of the wood prior to the charging of the sulphide-rich white liquor 20. The black liquor used for impregnation should be extracted from a position above the normal extraction strainer plate to ensure the highest possible sulphide concentration and a suitable alkali content.

Calculations indicate that theoretically the hydrosulphide concentration during the initial and bulk delignification phases 31 and 33 could be more than doubled by such a process combination. However, in reality, the practical maximum hydrosulphide concentration may be limited by the maximum acceptable dissolved lignin concentration during the initial and bulk delignification phases of the process.

Advantages

A relative increase in hydrosulphide concentration in the kraft digesting process can provide the following benefits:

1. Utilizing the increased hydrosulphide concentration in the initial and bulk phases of the digesting process to improve pulp strength properties.
2. Utilizing the increased hydrosulphide concentration in the digesting process to extend the delignification.
3. Maintaining the hydrosulphide concentration in the digesting process at the same level as in conventional processes while utilizing the resulting excess sulphide, either as is or after conversion to polysulphide or/and sulphite, for pre- or post-treatment of the wood/pulp to achieve higher yield, extended delignification, or improved pulp properties.
4. Achieving a decreased sulphur-to-sodium ratio in the recovery cycle to reduce emissions to air of sulphur containing compounds.

Benefit 2 above has been discussed previously in general terms. Benefit 3 enables the reduction of kappa numbers, and a number of different processes for pre-treatment of wood chips before or for post-treatment of pulp after the kraft pulping process have been described: Johansson, B. and Teder, A., "Modified kraft processes—a way to reduced environmental influence and reduced energy consumption", Proceedings of the 2nd World Congress of Chemical Engineering, Montreal, p. 235–242, 1981; Kleppe, P. J., "Process for delignification of wood pulp", Canadian Patent No. 1,221,809, 1984; Hartler, N. and Olsson, L. A., "Hydrogen sulphide cooking—Part 1, first stage variables", Svensk Papperstidning 75:13, p. 559–565, 1972; Cox, L. A. and Worster, H. E., "A status report on MacMillan Bloedel's hydrogen sulphide-kraft pulping process", Pulp & Paper Magazine of Canada 73:9,p. 106–109, 1972; Andrews, E. K., Chang, H.-m., Kirkman, A. G. and Eckert, R. C., "Extended delignification in kraft and kraft/oxygen pulping of softwood by treatment with sodium sulphide liquors", Japan TAPPI International Symposium on Wood Pulp Chemistry, p. 177–182, 1982; and Kirkman, A. G., Andrews, E. K., Chang, H-m., "Impact on extended delignification using green liquor pretreatments on kraft mill chemical and energy balances", AIChE Symposium Series 86, p. 66–73, 1984.

Many such processes would, however, require either a much higher total chemicals consumption or a very high S/Na-ratio in the recovery process, making them difficult to introduce utilizing conventional recovery processes.

For some of the process configurations, this can be changed if the sulphide demand of the kraft pulping stage of the process is reduced.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

I claim:

1. A process of increasing efficiency levels in a kraft pulping process utilizing individual initial, bulk and final phases of delignification of lignocellulosic materials, a recovery boiler and a causticizing plant comprising:

(a) leaching solid sodium sulphide- and sodium carbonate-containing smelt from the recovery boiler with a sulphide-lean white liquor from the causticizing plant to obtain a slurry of sulphide-rich white liquor, said white liquor comprising sodium hydroxide, sodium carbonate, sodium sulphate and sodium sulphide, said sulphide-lean white liquor having a substantially lower concentration of sodium sulphide than said sulphide-rich white liquor;

(b) separating sodium carbonate-containing solid particles from said sulphide-rich white liquor;

(c) dissolving the sodium carbonate content of said solid particles in water or in a weak wash from the causticizing plant to form a sodium carbonate solution;

(d) causticizing said sodium carbonate solution in the causticizing plant to produce said sulphide-lean white liquor having a sodium hydroxide content less than 15 wt. % and a sulphide to sodium content ratio lower than that of the smelt;

(e) directing at least part of said sulphide-rich white liquor of step (b) to the initial phase of the delignification process, said initial phase having an undissolved lignin content of cellulosic material greater than about 20 wt. % calculated on dry wood; and (f) directing at least part of said sulphide-lean white liquor from the causticizing plant to the final phase of the delignification process, said final phase having an undissolved lignin content of cellulosic material less than about 4 wt. % calculated on dry wood.

2. A process according to claim 1 wherein excess sulphide-rich white liquor from the initial phase is directed to the beginning of the bulk delignification phase of the delignification process, said bulk delignification phase having an undissolved lignin content of cellulosic material less than about 25 wt. % and greater than about 1 wt. % calculated on dry wood.

3. A process according to claim 1 wherein a portion of the sulfide-rich white liquor, the solid sodium carbonate, the sodium carbonate solution and the sulfide-lean white liquor are used in other pulping processes, pulp oxygen delignification plants, pulp bleaching plants or flue gas scrubbing processes.

4. A process according to claim 3 wherein the sodium carbonate is purified by washing.

5. A process according to claim 1 wherein the sodium carbonate is purified to produce a material with a low sulfide content.

6. A process according to claim 1 wherein the solids of the recovery boiler smelt are leached with water.

7. A process according to claim 1 wherein the process step (a) is operated at boiling temperatures under a steam blanket.

8. A process according to claim 7 wherein the process steps (a) and (b) are sealed from atmosphere.

9. A process of increasing efficiency levels in a kraft pulping process utilizing individual initial, bulk and final phases of delignification of lignocellulosic materials, said initial phase having an undissolved lignin content of cellulosic material of greater than 25 wt. % calculated on dry wood, said bulk phase having an undissolved lignin content of cellulosic material of less than 25 wt. % and greater than 1 wt. % calculated on dry wood, and said final phase having an undissolved lignin content of cellulosic material of less than 4 wt. % calculated on dry wood, and further utilizing a recovery boiler, and a causticizing plant said process comprising:

(a) leaching solid sodium sulphide- and sodium carbonate-containing particles comprising solidified smelt from the recovery boiler, with a sulphide-lean white liquor from the causticizing plant under boiling conditions under a steam blanket sealed from atmosphere to obtain a slurry of sulphide-rich white liquor, wherein said white liquor comprises sodium hydroxide, sodium carbonate, sodium sulphate and sodium sulphide, said sulphide-lean white liquor having a substantially lower concentration of sodium sulphide than said sulphide-rich white liquor;

(b) directing a part of the slurry of step (a) to a liquid-solids separating step, and recycling a part of the slurry to step (a) to form a depleted slurry of sulphide-rich white liquor;

(c) separating sodium carbonate containing solid particles from said depleted slurry of sulphide-rich white liquor of step (b);

(d) dissolving the sodium carbonate content of the solid particles in water or a weak wash from the causticizing plant to form a sodium carbonate solution and directing the sodium carbonate solution to the causticizing plant;

(e) causticizing the sodium carbonate solution in the causticizing plant to produce a weak wash and the sulphide-lean white liquor of step (a) and step (h), said sulphide-lean liquor having a sodium hydroxide content less than 15% by weight and a sulphide-to-sodium content ratio lower than the sulphide-to-sodium content ratio of the recovery boiler smelt;

(f) directing at least part of the sulphide-rich white liquor of a sulphide-to-sodium content ratio higher than the sulphide-to-sodium content ratio of the recovery boiler smelt, from the separation step (c) to the initial phase of the delignification process;

(g) directing excess sulphide-rich white liquor of a sulphide-to-sodium content ratio higher than the sulphide-to-sodium content ratio of the recovery boiler smelt, to the bulk phase of the delignification process; and (h) directing at least part of the sulphide-lean white liquor to the final phase of the delignification process wherein said white liquor comprises sodium hydroxide, sodium carbonate, sodium sulphate and sodium sulphide, and said sulphide-lean white liquor has a substantially lower concentration of sodium sulphide than said sulphide-rich white liquor.

* * * * *